US008289813B2

(12) United States Patent
Bull et al.

(10) Patent No.: US 8,289,813 B2
(45) Date of Patent: Oct. 16, 2012

(54) DEVICES AND SYSTEMS FOR OUTPUTTING CONTEXTUAL INFORMATION ABOUT AN EVENT FOR WHICH AN ALARM IS SET ON AN ELECTRONIC DEVICE

(75) Inventors: William Bull, Campbell, CA (US); Eric James Hope, Cupertino, CA (US); Alan Cannistraro, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 891 days.

(21) Appl. No.: 12/072,923

(22) Filed: Feb. 29, 2008

(65) Prior Publication Data

US 2009/0059731 A1 Mar. 5, 2009

Related U.S. Application Data

(60) Provisional application No. 60/967,500, filed on Sep. 4, 2007.

(51) Int. Cl.
*G04B 47/00* (2006.01)
*G04B 47/02* (2006.01)
*G06Q 10/00* (2006.01)

(52) U.S. Cl. .............. 368/73; 368/10; 368/13; 705/7.18

(58) Field of Classification Search .................... 368/10, 368/12, 72–74, 250, 28–29; 705/7.18–7.21; 455/412.1, 412.2
See application file for complete search history.

(56) References Cited

U.S. PATENT DOCUMENTS

| | | | | |
|---|---|---|---|---|
| 5,220,540 | A * | 6/1993 | Nishida et al. | 368/41 |
| 5,418,903 | A * | 5/1995 | Lee | 345/581 |
| 6,356,956 | B1 * | 3/2002 | Deo et al. | 719/318 |
| 6,678,215 | B1 * | 1/2004 | Treyz et al. | 368/10 |
| 6,795,377 | B2 * | 9/2004 | Gorden | 368/12 |
| 6,968,199 | B2 * | 11/2005 | Nagashima | 455/502 |
| 7,024,256 | B2 * | 4/2006 | Krzyzanowski et al. | 700/65 |
| 7,376,051 | B2 * | 5/2008 | Rosen | 368/63 |
| 2003/0002391 | A1 * | 1/2003 | Biggs | 368/82 |
| 2004/0243547 | A1 * | 12/2004 | Chhatrapati et al. | 707/2 |
| 2005/0169110 | A1 * | 8/2005 | Mazzilli et al. | 368/73 |
| 2008/0150959 | A1 * | 6/2008 | Marui | 345/594 |

* cited by examiner

*Primary Examiner* — Vit W Miska
(74) *Attorney, Agent, or Firm* — Fish & Richardson P.C.

(57) ABSTRACT

The present invention can permit an electronic device to output contextual information about an event when an alarm stored within the electronic device goes off. In one embodiment, an electronic device can permit a user to select an alarm template from a plurality of alarm templates and associate the selected alarm template with an alarm. When the alarm goes off at a later date, the electronic device can output the contextual information of the user-selected alarm template, thereby providing the user with contextual information relevant to the event for which the alarm was created. In another embodiment of the present invention, a receiving electronic device can automatically match alarm templates with alarms transferred from a transmitting electronic device. The present invention also can permit a user to create an alarm template, and customize alarm templates pre-populated by the manufacturer of an electronic device.

20 Claims, 8 Drawing Sheets

DEVICES AND SYSTEMS FOR OUTPUTTING CONTEXTUAL INFORMATION ABOUT AN EVENT FOR WHICH AN ALARM IS SET ON AN ELECTRONIC DEVICE

CROSS-REFERENCE TO RELATED APPLICATIONS

This application claims the benefit of U.S. Provisional Patent Application No. 60/967,500, filed Sep. 4, 2007, which is hereby incorporated by reference herein in its entirety.

BACKGROUND OF THE INVENTION

Electronic devices (e.g., cellular telephones and handheld media players) can provide utility to users. One example of such utility can be an alarm function. In conventional alarm functions for electronic devices, the user can set the date and time for an alarm. When the user-selected date and time is reached, an audio and/or a visual indication is provided to the user by the electronic device. This indication can be in the form of a repeated alarm tone or ring, for example.

In some electronic devices, a user may not be able to program the alarm to display contextual information (e.g., event-specific information). The user generally must remember or record contextual information elsewhere (usually outside of the device).

It can be desirable for an electronic device to reduce or minimize the number of buttons used for user input. However, limiting the number of buttons can reduce the user's ability to customize electronic device features. For example, when an electronic device does not have a keyboard, a user may not be able to easily associate contextual information with an alarm.

There are currently available applications that provide a user with the ability to program alarms. Examples of these applications include iCal™, marketed by Apple Inc., of Cupertino, Calif., and Outlook™, marketed by Microsoft Corporation, of Redmond, Wash. These applications can allow a user to create alarms that can be programmed by the user to include contextual information, which can identify the event for which the alarm was created. However, when the user wishes to transfer that alarm to another electronic device, the receiving electronic device may not be able to automatically present the contextual information when the alarm goes off.

SUMMARY OF THE INVENTION

The present invention can permit an electronic device to output contextual information about an event when an alarm stored within the electronic device goes off.

In one embodiment of the present invention, an electronic device can permit a user to select an alarm template from a plurality of alarm templates and associate the selected alarm template with an alarm. Each user-selectable alarm template can be pre-populated (either by the manufacturer or the user) with contextual information related to a certain type of event. When the alarm goes off at a later date, the electronic device can output the contextual information from the user-selected alarm template, thereby outputting contextual information relevant to the event for which the alarm was created.

In another embodiment of the present invention, an electronic device can automatically associate alarm templates with alarms transferred from another electronic device, such as a computer. For example, in an electronic device that cannot automatically output contextual information stored within a transferred alarm, the present invention can permit that electronic device to output contextual information related to the event by automatically associating one of a plurality of alarm templates to the transferred alarm. The electronic device can determine the appropriate alarm template to automatically associate with the transferred alarm by parsing the alarm and associating the parsed alarm with an appropriate alarm template. Thus, when the alarm goes off at a later date, the electronic device can output contextual information from the alarm template, thereby providing the user with contextual information relevant to the event for which the alarm was originally created.

The present invention also can permit a user to create an alarm template and indicate the contextual information of that alarm template. The present invention also can provide the user with manufacturer-programmed alarm templates having contextual information that a user can customize.

BRIEF DESCRIPTION OF THE DRAWINGS

The above and other advantages of the present invention will become more apparent upon consideration of the following detailed description, taken in conjunction with the accompanying drawings, in which like reference characters refer to like parts throughout, and in which.

DETAILED DESCRIPTION OF THE DISCLOSURE

Apparatuses, systems, and methods for providing a user with contextual information about an event when an alarm programmed into in an electronic device goes off are provided and described with reference to FIGS. 1-8.

Conventional alarm applications generally do not provide contextual information about the event for which the alarm is created. Because some electronic devices (such as, e.g., handheld media players) do not comprise a keyboard to enter text, a user generally cannot enter the contextual information, and therefore is required to either remember the contextual information for the alarm or record the contextual information elsewhere. Furthermore, when alarms are transferred to an electronic device, some electronic devices are unable to provide contextual information about the events for the transferred alarms.

The present invention can be used to improve the user experience with alarms by outputting contextual information when an alarm goes off. The contextual information can, for example, relate to the event for which the alarm is created, and can be stored, for example, in a user-selectable alarm template. The present invention can further improve the user experience by providing contextual information for alarms transferred into an electronic device. This can be done, for example, by automatically associating transferred alarms with alarm templates.

Contextual information can be any information that can relate to a type of event for which an alarm can be set. For example, contextual information can comprise template graphics and template audio. Template graphics can include, for example, text (e.g., a message relating to the type of event for which an alarm can be set, or a message indicated by the user), still images (e.g., an icon, an image relating to the type of event for which an alarm can be set, or a stored image indicated by the user), and/or animations. Animations can include any moving images, such as, videos, cycling through a plurality of still images, the use of graphics effects (e.g., image dissolves, image wipes, and the like), Java™ applets (which can be produced by Java™, marketed by Sun Microsystems, Inc., of Sunnyvale, Calif.), and Flash™ movies (which can be produced by Adobe Flash™, marketed by Adobe Systems, Inc., of San Jose, Calif.). Template audio can include any sound or sounds, and can be either in the form of a played back audio file or a pattern of beeps (e.g., those generated by a piezoelectric speaker). In some embodiments, the template audio can include a pattern of sound or music that relates to the type of event for which an alarm can be set (e.g., the birthday song for a birthday event).

Figure 1:
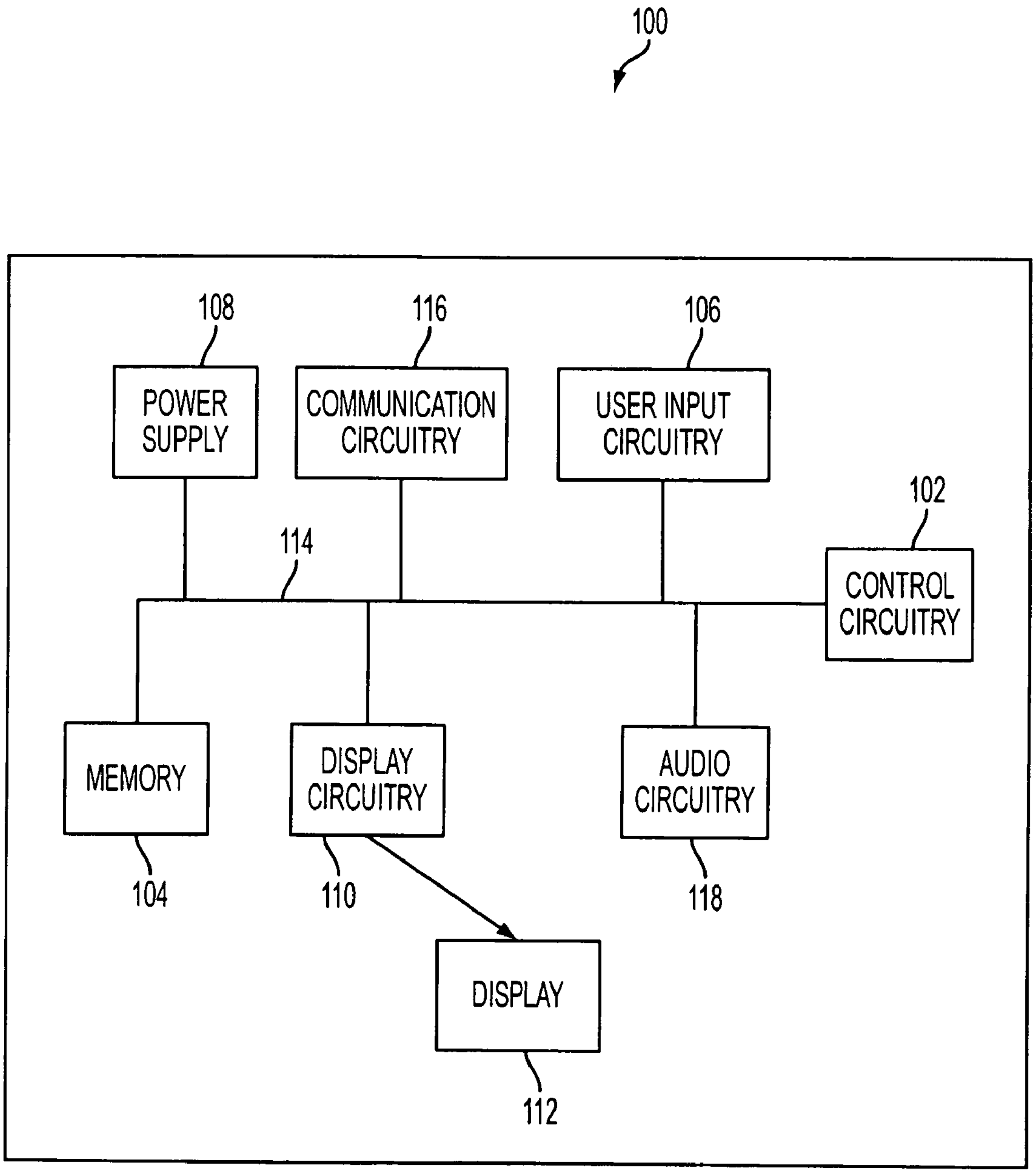
FIG. 1 illustrates a simplified block diagram of an illustrative electronic device in accordance with one embodiment of the present invention.

FIG. 1 illustrates a simplified block diagram of an illustrative electronic device in accordance with one embodiment of the present invention. Electronic device 100 can include control circuitry 102, local client memory 104, user input circuitry 106, power supply 108, display circuitry 110, display 112, bus 114, communication circuitry 116, and audio circuitry 118. In some embodiments, electronic device 100 can include more than one of each component, but for the sake of illustration, only one is shown in FIG. 1. Also, while FIG. 1 illustrates components 102-118 integrated with device 100, one or more components can be disposed external to the device and coupled thereto (e.g., display 112 and audio circuitry 118).

Memory 104 can include one or more storage mediums, including for example, a hard-drive, flash memory, permanent memory such as ROM, semi-permanent memory such as RAM, any other suitable type of storage component, or any combination thereof. Memory 104 can include cache memory, which may be one or more different types of memory used for temporarily storing data for electronic device applications. Memory 104 may store media data (e.g., music and video files), software (e.g., for implementing functions on device 100), firmware, preference information (e.g., media playback preferences), contacts information (e.g., telephone numbers and email addresses), calendar information, any other suitable data, or any combination thereof.

Display circuitry 110 can accept and/or generate signals for presenting media information (e.g., textual, graphical, and tactile information) on display 112. For example, display circuitry 110 can include a coder/decoder (CODEC) to convert digital media signals into analog signals. Display circuitry 110 also can include display driver circuitry and/or circuitry for driving display driver(s). The display signals can be generated by control circuitry 102 or display circuitry 110. In some embodiments, display circuitry 110 and control circuitry 102 can be the same, or display circuitry 110 can be subsumed within control circuitry 102.

In some embodiments, display 112 can be integrated with or externally coupled to electronic device 100. Display 112 may take any of various forms, including, but not limited to visual displays, proximity-sensitive displays, or combinations thereof.

In some embodiments, audio circuitry 118 can be integrated with or externally coupled to electronic device 100. Audio circuitry 118 can comprise piezoelectric speakers (which can be multipurpose, provide buzzer functionality, and can be tuned to output a range of frequencies in certain embodiments to produce different sounds), audio speakers, headphones, audio line-outs, or combinations thereof.

Electronic device 100 also may be equipped with user input circuitry 106 that can permit a user to interact or interface with device 100. For example, user input circuitry 106 can take a variety of forms, including, but not limited to, buttons, electronic device pads, dials, trackballs, joysticks, switches, microphones, click wheels, touch screens, electronics for accepting audio and/or visual information, antennas, infrared ports, or combinations thereof. User input circuitry 106 may include a multi-touch screen such as that described in U.S. Pat. No. 6,323,846, which is incorporated by reference herein in its entirety. User input circuitry 106 may emulate a rotary phone or a multi-button electronic device pad, which may be implemented on a touch screen or the combination of a click wheel or other user input device and a screen. A more detailed discussion of such a rotary phone interface may be found, for example, in U.S. patent application publication No. 2007-0152983, published Jul. 5, 2007, entitled "Touch Pad with Symbols based on Mode," which is incorporated by reference herein in its entirety.

Furthermore, in certain embodiments of the present invention, each one of the one or more input components of user input circuitry 106 of device 100 can be configured to provide one or more dedicated control functions for making selections or issuing commands associated with operating the device. By way of example, in the case of a music file player, the functions of user input circuitry 106 can be associated with powering up or down the device, opening or closing a menu, playing or stopping a song, changing a mode, and the like.

Communications circuitry 116 can permit device 100 to communicate with one or more servers (e.g., a computer or a central server) or other entities using any suitable communications protocol. For example, communications circuitry 116 can include circuitry for hard-wired communication or wireless communication (e.g., short-range and/or long-range communication), such as Wi-Fi enabling circuitry that permits wireless communication according to one of the 802.11 standards. Other wireless protocol standards could also be used, either in alternative or in addition to the identified protocol, using electromagnetic waves, for example. Another network standard may be Bluetooth®, Ethernet, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Communications circuitry 116 can include circuitry that enables device 100 to be electrically coupled to another device (e.g., a computer or an accessory device) and communicate with that other device. Communications circuitry 116 can also include circuitry for sending and receiving media, including, but not limited to, microphones, amplifiers, digital signal processors (DSPs), image sensors (e.g., charge coupled devices (CCDs)) or optics (e.g., lenses, splitters, filters, etc.), antennas, receivers, transmitters, transceivers, and the like.

Bus 114 can provide a data transfer path for transferring data to, from, or between control circuitry 102, local client memory 104, user input circuitry 106, power supply 108, display circuitry 110, communication circuitry 116, audio circuitry 118, and any other components of device 100.

Power supply 108 can provide power to the components of device 100. In some embodiments, power supply 108 can be coupled to a power grid (e.g., a personal computer). In some embodiments, power supply 108 can include one or more batteries for providing power in a portable device (e.g., a portable music player). As another example, power supply 108 can be configured to generate power in a portable device from a natural source (e.g., solar power using solar cells). As set forth herein, electronic device 100 can be operated in accordance with the principles of the present invention in order to associate alarm templates with alarms stored in the electronic device.

Figure 2:
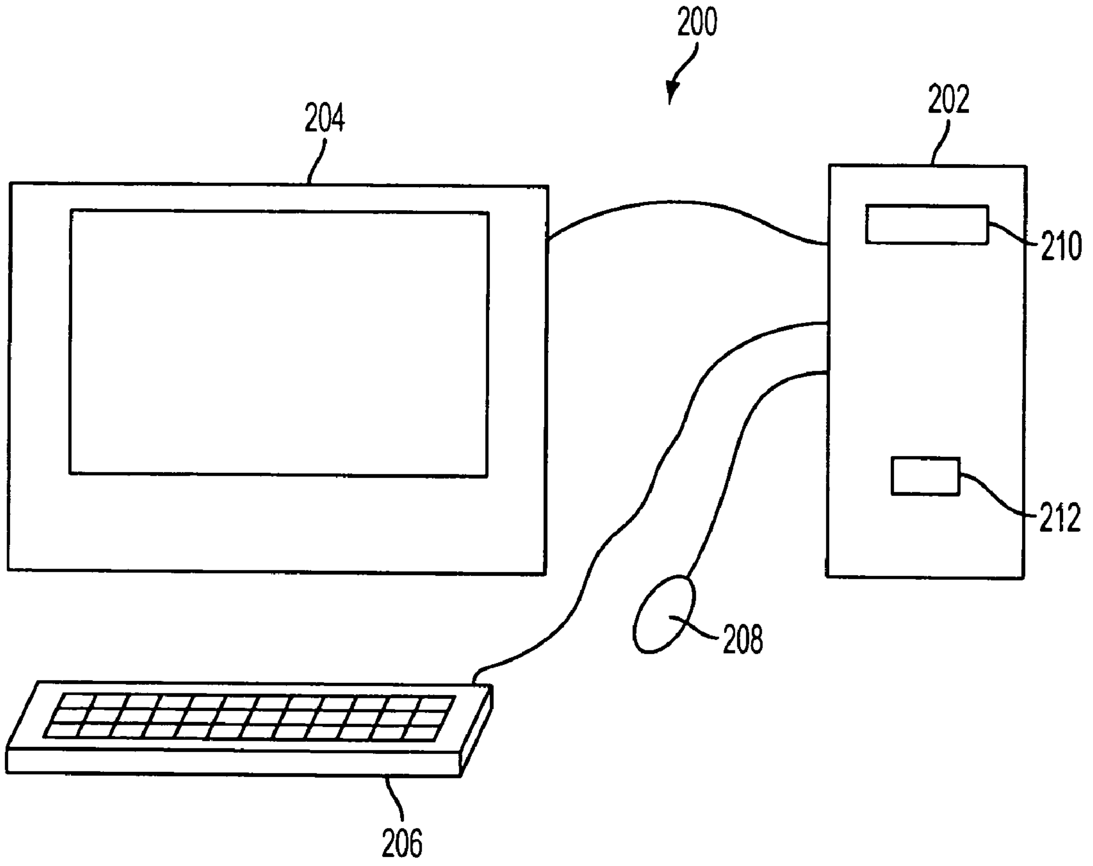
FIG. 2 is a schematic diagram of a computer system that operates in accordance with an embodiment of the present invention.

FIG. 2 is a schematic diagram of computer system 200 that operates in accordance with an embodiment of the present invention. Computer system 200 may include processor box 202, monitor 204, keyboard 206, and mouse 208. Processor box 202 may include various components, such as those described below with respect to FIG. 3, as well as optical drive 210. In addition, external drives, such as FLASH sticks or other such devices, may be connected to processor box 202 via one or more ports that are located, in this instance, on a section 212 of the front panel of processor box 202. As set forth in detail below, computer system 200 may be operated in accordance with the principles of the present invention as described in greater detail below.

Figure 3:
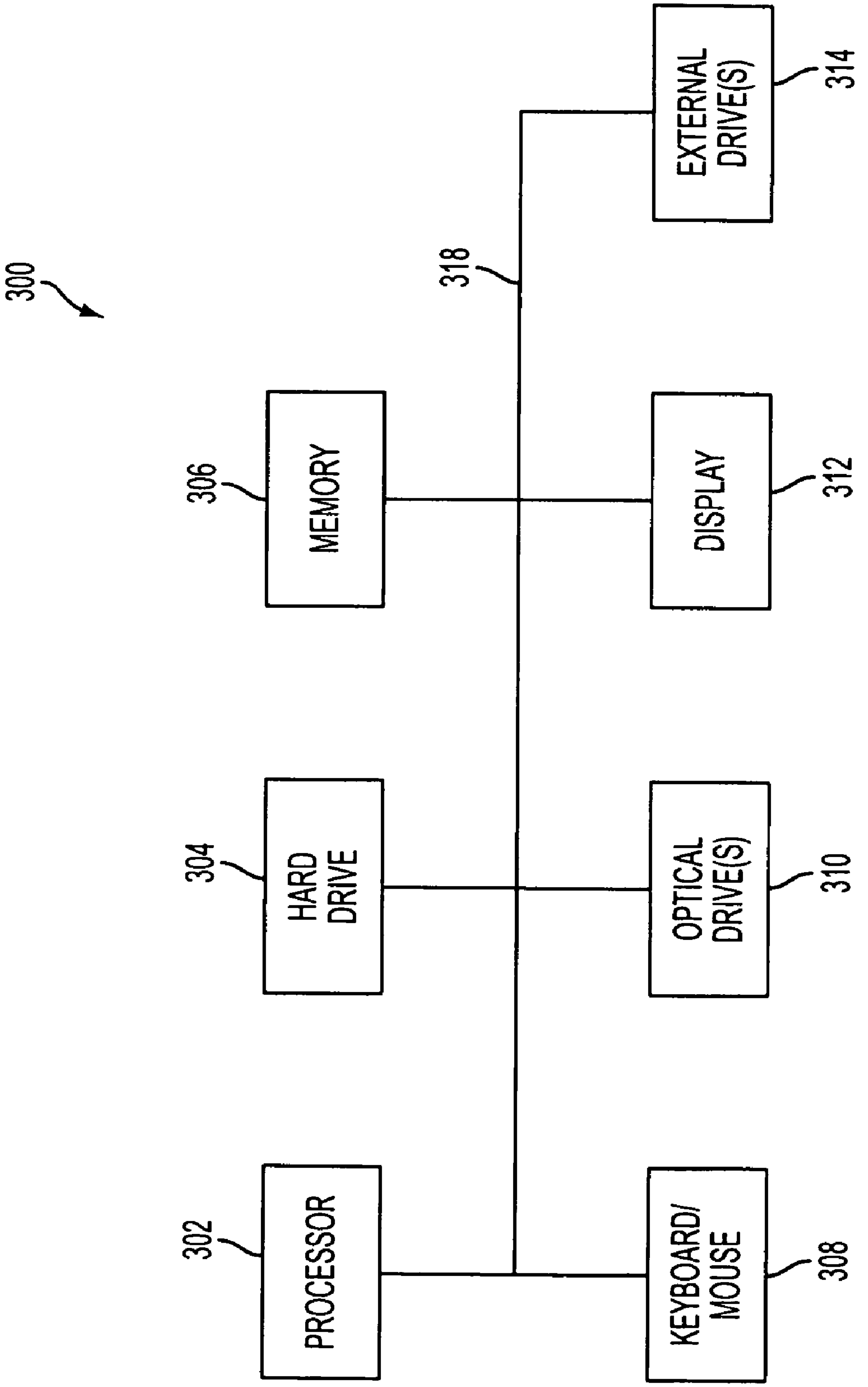
FIG. 3 is a schematic diagram of a computer system that operates in accordance with an embodiment of the present invention.

FIG. 3 shows computer system 300, which can be a further representation of computer system 200 of FIG. 2. Computer system 300 can include processor 302, hard drive 304, memory 306, keyboard/mouse 308, optical drive(s) 310, display 312, and external drive(s) 314. For purposes of illustration, each of the components shown in FIG. 3 is shown coupled to one another via one or more buses 318. For example, keyboard/mouse 308 is typically connected to the computer via a USB connection (i.e., a universal serial bus), while the processor and memory communicate via a separate, high-speed bus. Computer system 300 may be operated in accordance with the principles of the present invention as described in greater detail below.

Figure 4:
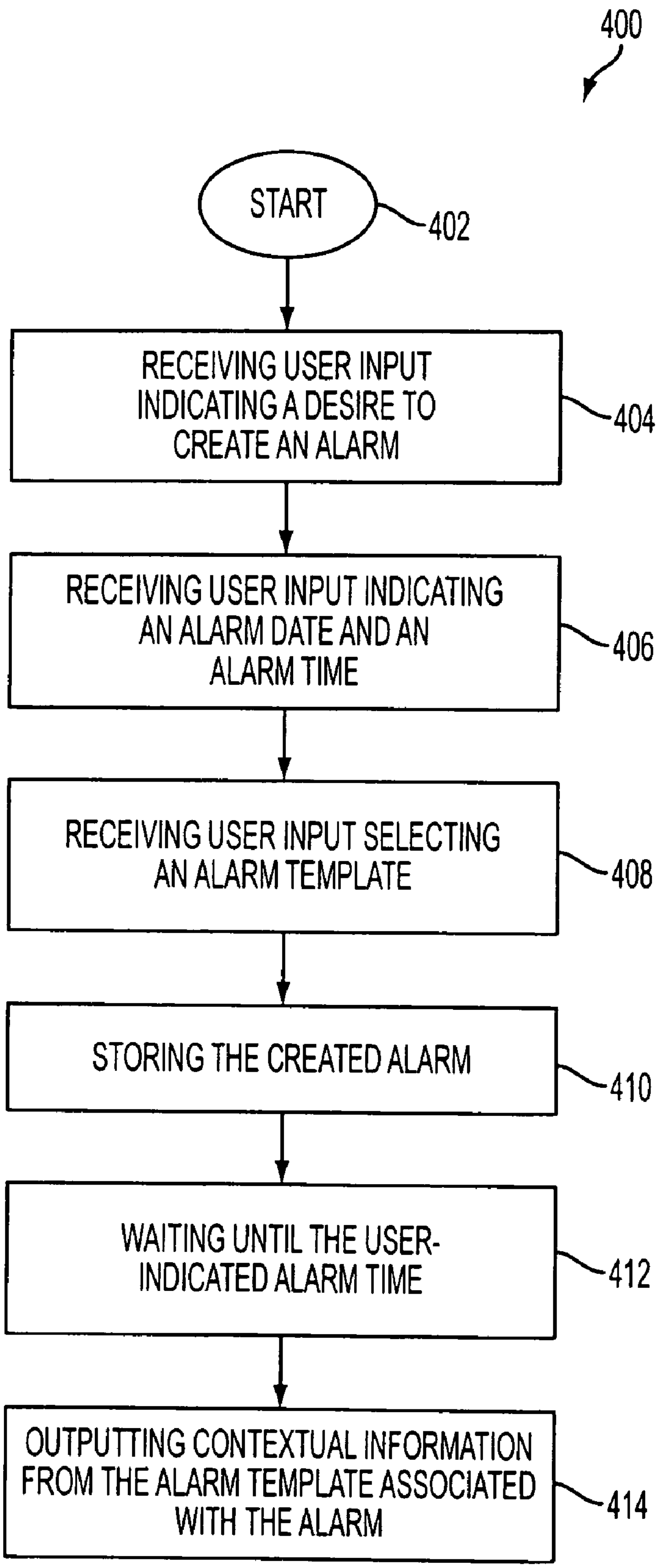
FIG. 4 is a flow chart illustrating an exemplary process for providing contextual information to a user about an event for which an alarm is set on an electronic device in accordance with an embodiment of the present invention.
Figures 5A, 5B, 5C, 5D, 5E, 5F, 5G, 5H, 5I, 5J:
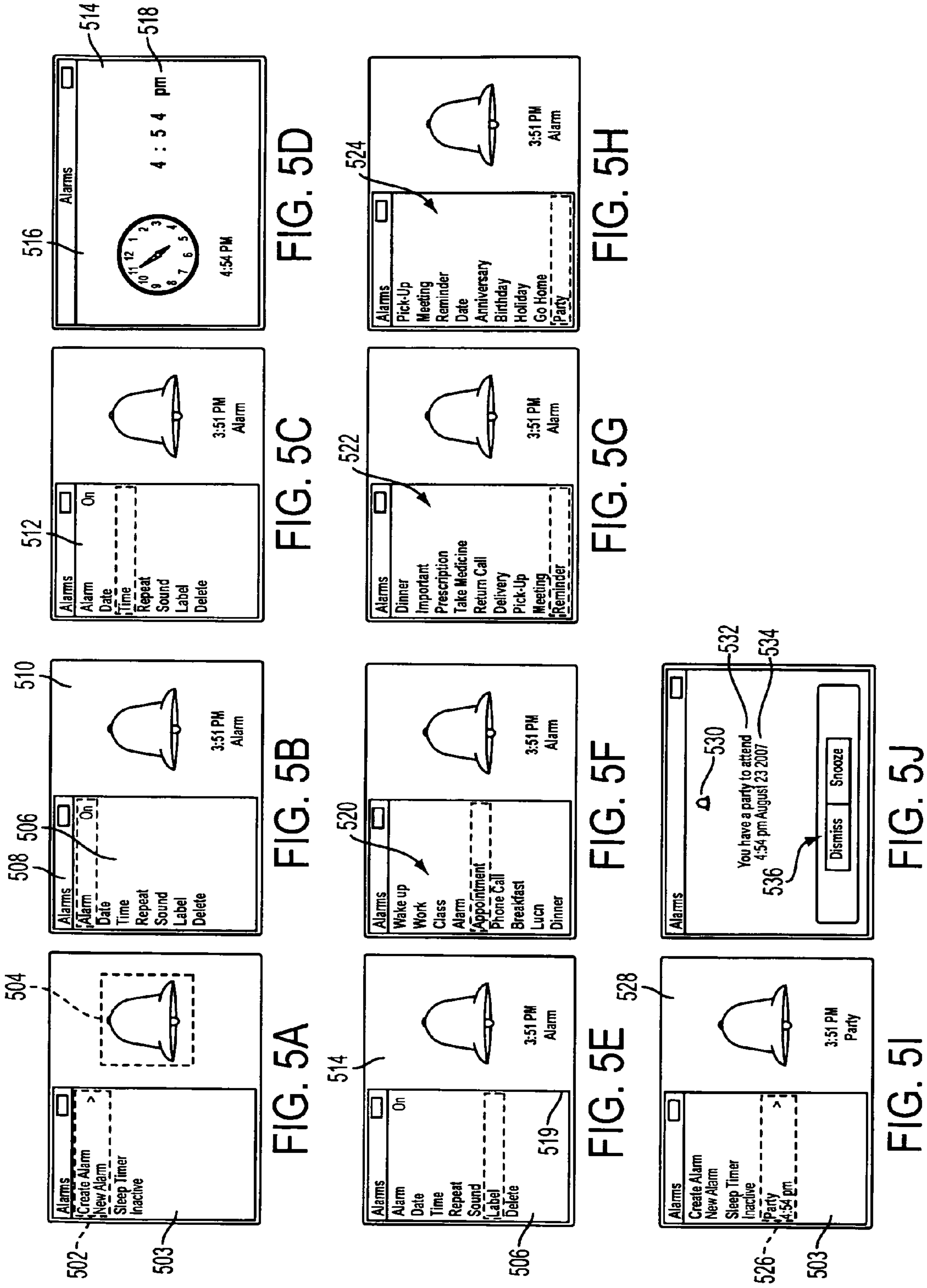
FIGS. 5A-5J show illustrative user interfaces that illustrate an exemplary process for providing contextual information to a user about an event for which an alarm is set on an electronic device in accordance with one embodiment of the present invention.

FIG. 4 is a flow chart illustrating exemplary process 400 for providing contextual information to a user about an event for which an alarm is set on an electronic device in accordance with an embodiment of the present invention.

At step 402, the electronic device can be initialized, and at step 404, the electronic device can receive user input indicating a desire to create an alarm. The user input can include, for example, selecting a menu option or an icon to create a new alarm, or any other suitable way of indicating a desire to create an alarm.

At step 406, the electronic device can receive user input indicating an alarm date and an alarm time. The alarm date and alarm time can be indicated by any known method, including, for example, by entry using an alphanumeric keypad, scrolling through a menu and selecting the alarm date and alarm time, selecting an alarm date and alarm time from a calendar, selecting an alarm time from a graphical representation of an analog clock, or by selecting a month, day, year, hour, and/or minute each from a menu, in any sequence, combination, or order. The present invention is not restricted to indicating the alarm date and alarm time in any specific order, and the date and time may be indicated or changed sequentially or substantially at the same time.

In some embodiments, the electronic device may provide a default alarm date and a default alarm time that the user can change. In step 406, the user can change either alarm date or alarm time, or change both. For example, a user can enter an alarm time, and not change the default alarm date (e.g., the same day the alarm is created), or vice versa. The user in this example would have indicated an alarm date and an alarm time, even though the user did not actively enter the alarm date.

At step 408 the electronic device can receive user input selecting an alarm template for association with the alarm. Alarm templates can be data structures that can include a template label and contextual information. Alarm templates can be pre-populated onto the electronic device, or can be customized or created by a user.

A template label can be presented to a user and be used to represent the context information presented when the alarm goes off. The template label can comprise a text word or phrase, and/or an icon or image that can relate to an event type to which the alarm template corresponds. Using a template label can be advantageous because it can summarize the content of an alarm template in a form that is easier for the user to quickly scan or browse through. Exemplary template labels can include “wake up” for an alarm template related to waking-up events, “call” for a telephone call alarm template, and “birthday” for a birthday alarm template. Pre-populated alarm templates can have default template labels, which, in some embodiments, can be changed by the user as described below in connection with FIGS. 7-8. In user-created alarm templates, the user can assign an appropriate template label.

As stated hereinabove, a alarm template can contain contextual information in the form, for example, of template graphics and template audio. For example, a birthday alarm template can contain template graphics in the form of a text message relating to the birthday event type (e.g., “today is the birthday of somebody important”), and a birthday-themed image, icon, picture, or animation (e.g., a birthday cake icon, a party hat icon, and the like). The birthday alarm template can also comprise template audio in the form of a piece of music being played or looped (e.g., “Happy Birthday,” or an audio file selected by the user). A birthday alarm template can contain any of the aforementioned examples of contextual information alone, or in combination.

In some embodiments, contextual information can be enabled or disabled by a user when creating the alarm (e.g., by selecting or deselecting the contextual information in a submenu). For example, in the birthday alarm template example discussed above, a user could disable the text message, the still image, or the audio.

At step 410, the created alarm, which includes the user-indicated alarm date, alarm time, and the user-selected alarm template, can be stored on the electronic device. In some embodiments, this can be done in a calendar application on the electronic device, wherein a user can view all stored alarms, for example. At step 412, the device can then wait until the user-selected alarm date and alarm time arrive.

At step 414, the contextual information from the alarm template associated with the alarm can be output at the alarm date and alarm time. For instance, in the birthday alarm template example discussed above, the text message, the still image, and the audio can be output.

Process 400 can enhance the functionality of an alarm application of an electronic device because it can output contextual information about an event when an alarm programmed into the electronic device goes off. This can be advantageous because the user can avoid spending time and effort attempting to remember the event for which the alarm was created if the user has forgotten. Furthermore, by selecting an alarm template from a list stored on the electronic device, the user can create alarms that provide contextual information without the use of complex input devices, such as a keyboard. This can further enhance the user experience because complex input devices may be omitted from electronic devices due to a desire to increase portability and/or reduce device complexity.

FIGS. 5A-5J show illustrative user interfaces that illustrate process 400 in accordance with one embodiment of the present invention.

For example, in user interface 5A, a user can indicate desire to create an alarm by highlighting and selecting "create alarm" menu option 502 in alarm main menu 503. User interface 5A can comprise alarm menu graphics 504, which can be any desired graphic (e.g., an alarm bell). Alarm menu graphics 504 can be advantageous because it can indicate to the user that he is interacting with the alarm function.

Upon selection of "create alarm" menu option 502, alarm property menu 506 can be displayed, as seen in user interface 5B. Alarm property menu 506 can comprise, for example, alarm properties 508. Alarm properties 508 are all adjustable by a user, and can include the option to disable or enable the alarm, set the alarm date, set the alarm time, set the repeat function (e.g., repeat a sound output when the alarm goes off, and/or repeat an alarm at one or more predetermined intervals of time, such as daily, weekly, monthly, or any suitable interval), set the sound properties, set the alarm template (e.g., "label" in user interface 5B), and delete the alarm.

Also, when "create alarm" menu option 502 is selected, alarm properties graphics 510 can be displayed, as seen in user interface 5B. Alarm properties graphics 510 can comprise a default time (such as the current time stored in the electronic device) and a default template label, if no alarm time or template label has been set. For example, a default template label can appear in alarm properties graphics 510 as "alarm" or "unassociated."

A user can indicate the alarm time by highlighting and selecting the time property, as shown in properties menu 512 of user interface 5C. Upon selecting the time property, alarm time edit screen 514 can be displayed, as shown in user interface 5D. Alarm time edit screen 514 can include alarm time edit graphics 518, wherein a user can indicate the alarm time (e.g., by scrolling the hour, minute, and A.M./P.M. indicators to the desired alarm time). Alarm time edit screen 514 can also include alarm time graphics 516, which can contain digital and/or analog clock representations of the alarm time indicated by the user.

After the alarm time is set, the electronic device can return to alarm property menu 506 of user interface 5E. Also, after the alarm time is set, alarm properties graphics 519 of user interface 5E can be displayed. Alarm properties graphics 519 can be similar to alarm properties graphics 510, and can display a default time and a default template label. In some embodiments, alarm properties graphics 519 can reflect the indicated alarm time (e.g., for the example shown, the time can read "4:54 PM"). If the user desires to select an alarm template to be associated with the alarm, the label property can be highlighted and selected as shown in alarm property menu 506 of user interface 5E.

If the label property is selected, then a menu containing template labels can be displayed, as seen in template label menu 520 of user interface 5F. As stated hereinabove, each template label can correspond to an alarm template relating to a different type of event.

Template label menu 520 can be scrolled to display additional template labels, as seen in template label menu 522 in user interface 5G and in template label menu 524 in user interface 5H. If the user would like to associate a party alarm template with the alarm, the party template label can be highlighted and selected, as is shown in user interface 5H. In some embodiments, a sub-menu can be displayed when the party template label is selected, wherein the sub-menu contains a number of contextual information entries (e.g., template graphics entries, including text message entries, still image entries, and animation entries, and template audio entries). Each contextual information entry can be enabled or disabled by the user. For example, the user can choose to enable one or more template graphics entries without enabling template audio entries.

After the party template label is selected, the alarm main menu 503 can be displayed, as is shown in user interface 5I. Alarm main menu 503 can also include created alarm 526. If created alarm 526 is highlighted, as shown in alarm main menu 503, alarm properties graphics 528 can be displayed. Alarm properties graphics 528 can be similar to alarm properties graphics 510, but can reflect the selected template label for the highlighted created alarm. As discussed previously with respect to alarm properties graphics 519, the alarm time displayed in alarm properties graphics 528 can, in some embodiments, be updated to reflect the indicated alarm time. The properties of created alarm 526 can be edited if created alarm 526 is selected by the user. If the user does not wish to edit created alarm 526, then the user can exit the alarm main menu 503.

After waiting until the indicated alarm date and alarm time, the alarm can go off as shown in user interface 5J. User interface 5J can include alarm display graphics 530 (which can be any desired graphics), stored alarm date and alarm time 534, and alarm user options 536. Alarm user options 536 can comprise user options on how to respond to the alarm, and can, for example, include a command for dismissing the alarm and/or a command that causes the alarm to snooze. The period of time under which the alarm is snoozed may be automatically assigned to a default value or may be assigned a value by the user.

User interface 5J can also include contextual information 532. As stated hereinabove, contextual information 532 can comprise template graphics and/or template audio. For the present example, the party alarm template can cause the electronic device to output a text message and/or output template audio, which can include an audio message reading the text message aloud, or can include a default audio track (e.g., party music).

The embodiments shown in FIGS. 5A-5J can be advantageous generally for the same reasons as process 400, described hereinabove. The functionality of an alarm application of an electronic device can be enhanced because the present invention can provide a user with contextual information about an event when an alarm programmed into the electronic device goes off. This can be advantageous because the user can avoid spending time and effort attempting to remember the event for which the alarm was created if the user has forgotten. Furthermore, by selecting a alarm template from a list stored on the electronic device, the user can create alarms that provide contextual information without the use of complex input devices such as a keyboard.

Figure 6:
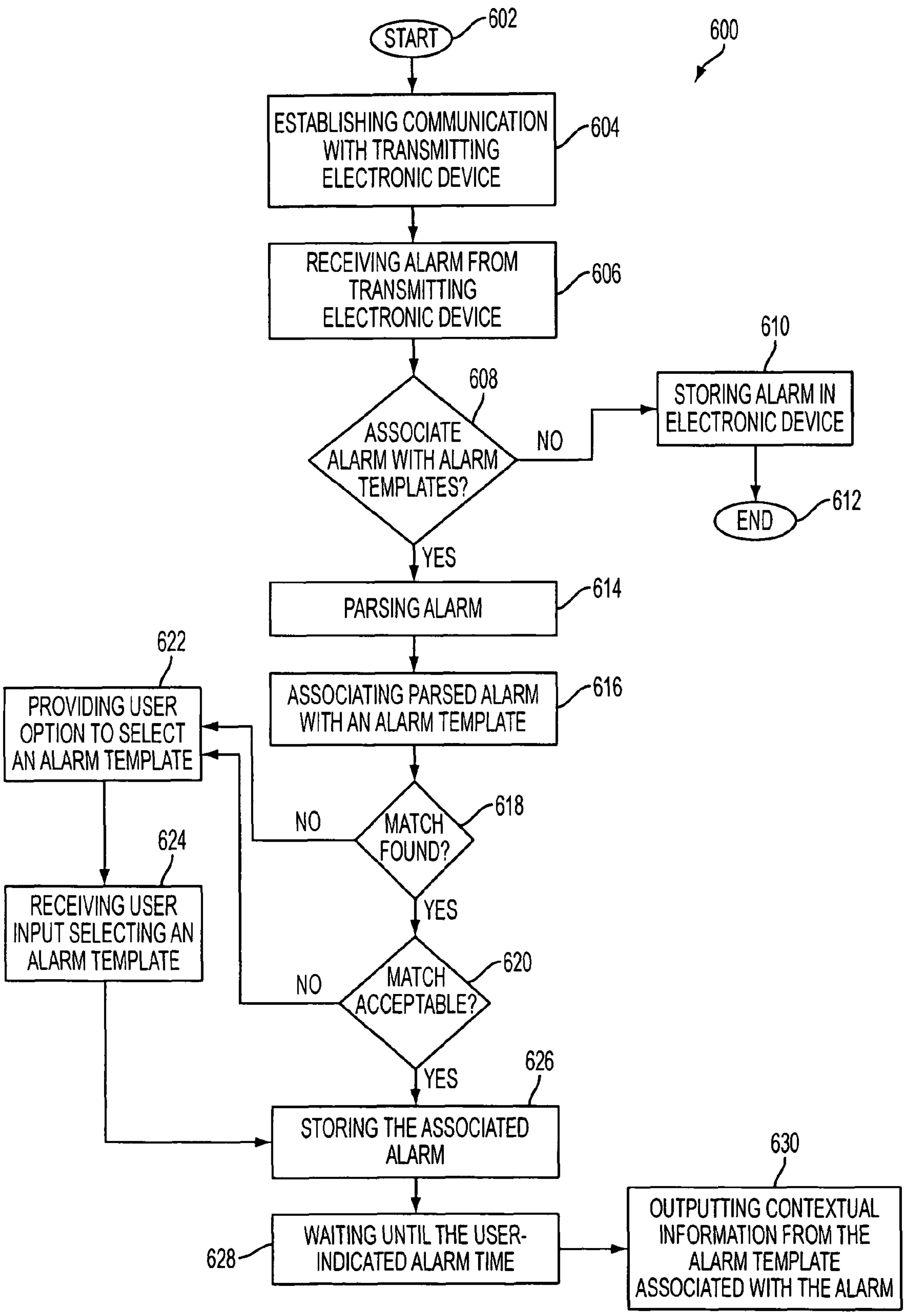
FIG. 6 is a flow chart illustrating an exemplary process for providing contextual information to a user about an event for which an alarm was set and transferred to an electronic device in accordance with an embodiment of the present invention.

FIG. 6 is a flow chart illustrating exemplary process 600 for providing contextual information to a user about an event for which an alarm was set and transferred to an electronic device in accordance with an embodiment of the present invention.

Certain applications, including iCal™ and Outlook™, for example, provide alarm functions. These alarm functions generally provide an alarm display or message at a user-selected alarm date and alarm time. Alarm functions can allow a user to indicate contextual information (e.g., information relating to an event for which the alarm is set) that can be displayed when the alarm goes off. However, when the user wishes to transfer that alarm to another electronic device, the receiving electronic device may not be able to automatically present the contextual information when the alarm goes off. Process 600 can alleviate this problem by automatically associating an appropriate alarm template with the transferred alarm, which can cause contextual information to be displayed on the receiving electronic device when the alarm goes off.

Contextual information for alarms created in the aforementioned applications can take the form of a subject line. The subject line can be a summary, usually comprising one line of text, of the alarm's purpose or the event for which the alarm was set. Contextual information for alarms created in applications with alarm functions can also take the form of a more detailed description. The detailed description can be longer and more specific in its description of the purpose of the alarm than the subject line, and generally includes information such as the location of a meeting, items to bring to an appointment, etc.

At step 602, process 600 is initialized, and at step 604, communication is established between a transmitting electronic device and a receiving electronic device. The transmitting electronic device can, in some embodiments, be an electronic device with a complex input device, such as a computer having calendar applications. The user can generally create alarms on the transmitting electronic device having user-created contextual information as described above. The receiving electronic device can be any suitable electronic device (e.g., an iPod™ or iPhone™, marketed by Apple Inc., of Cupertino, Calif.).

The communication between the transmitting electronic device and the receiving electronic device can permit at least one alarm to be transferred from the transmitting electronic device to the receiving electronic device. The communication may be implemented using either a hard-wired data connection (e.g., USB or FireWire™), and/or a wireless data connection (e.g., Wi-Fi or Bluetooth®). An example of establishing communication between the transmitting electronic device and the receiving electronic device can be docking a portable media player with a computer.

At step 606, the electronic device receives at least one alarm from the transmitting electronic device through the established data connection. The alarm(s) can be received from any alarm application, such as iCal™ or Outlook™. The alarm(s) can be received directly from an alarm application, or through an application (e.g., iTunes™ marketed by Apple Inc.) used to synchronize or interface information stored on the two electronic devices. The alarm(s) can be transferred to the receiving electronic device, for example, one alarm at a time, or in bulk.

At step 608, the user can be prompted to determine whether or not to associate the alarm(s) with alarm templates. If the user elects not to associate the alarm(s) with alarm templates at step 608, the alarms can be stored in the electronic device at step 610 (e.g., into the calendar of the electronic device). In some embodiments, this can mean a generic alarm template, which generally does not contain contextual information, or contains default contextual information, can be assigned to each alarm. At step 612, process 600 ends. Steps 608-612 can be advantageous because, for example, a user may not want to wait for the remainder of process 600 to be executed.

If the user elects to associate the alarm(s) with alarm templates at step 608, then the alarm can be parsed at step 614. Parsing can mean, for example, analyzing the transferred alarm(s). All of the contextual information, or a portion thereof, of an alarm can be parsed. For example, in the transferred alarm(s) illustratively described above, only the subject line of an alarm can be parsed, or the detailed description can be parsed in addition to the subject line, or instead of the subject line. Also, in some embodiments, the user can designate the contextual information to be parsed automatically.

At step 616, the alarm can be automatically matched with alarm templates. In some embodiments, alarm templates can include a stored set of keywords, which can include one or more words or phrases related to an event type associated with the alarm template. The electronic device can, for example, search the parsed alarm to see if some or all of its contextual information contains any keywords (or variants of the keywords) from the alarm templates. If a match is found, the alarm can be associated with the alarm template. In another embodiment, the parsed alarm can include a reference to an alarm template. The reference can be, for example, designated by a user when creating the alarm in the transmitting electronic device. The reference can be used to associate the parsed alarm with the designated alarm template.

At step 618, if a match is not found, then step 622 can be executed and the electronic device can provide the user with an option to select an alarm template. This can be done, for example, by providing the user with a list of alarm templates similar to that described above with respect to FIGS. 5F-5H. After the alarm template is selected in step 624, the associated alarm can be stored in the electronic device.

If an alarm has been associated with an alarm template at step 616, then step 620 can be executed, and the user can be prompted to accept the associated alarm template. If the user accepts the associated alarm template at step 620, which can mean that the associated alarm template is a desired alarm template, then the associated alarm data can be stored in the electronic device at step 626. At step 628, the device can then wait until the user-selected date and time arrive. At step 630, the contextual information from the alarm template associated with the alarm can be output at the alarm date and alarm time.

The user can also decline the associated alarm template at step 620, when the associated alarm template is not a desired alarm template. This can occur, for example, when multiple alarm templates can be associated with the alarm (e.g., a plurality of alarm templates are matched with the alarm), and the user desires a different alarm template to be associated with the alarm. If the associated alarm template is declined at step 620, then steps 622 and 624 can be executed as described hereinabove. In one embodiment, when a plurality of alarm templates are matched with the alarm, the list of alarm templates provided in step 622 can include only the matched alarm templates.

After the alarm template is selected in step 624, the associated alarm data can be stored in the receiving electronic device, as described hereinabove, at step 626. At step 628, the receiving electronic device can then wait until the user-selected alarm date and alarm time arrive. At step 630, the contextual information from the alarm template associated with the alarm can be output at the alarm date and alarm time.

Process 600 can be advantageous at least because contextual information can be provided for alarms received from a transmitting electronic device, as well as for the reasons discussed herein. Process 600 can further enhance user experience because it can automatically associate alarms received from a transmitting electronic device with alarm templates, instead of requiring a user to select an alarm template for each alarm, which can save time.

Figure 7:
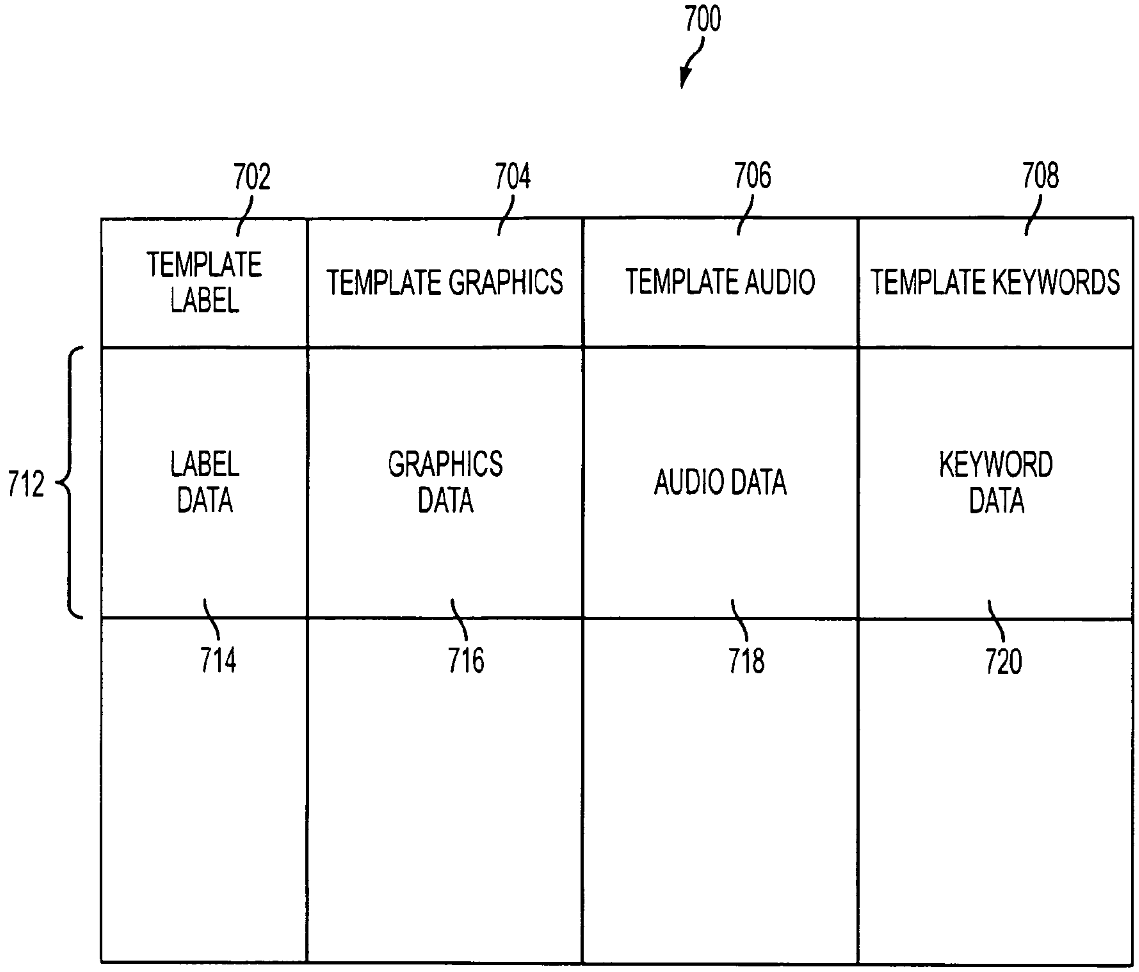
FIG. 7 is an exemplary database containing alarm templates, each comprising contextual information for an event for which an alarm can be set on an electronic device in accordance with embodiments of the present invention.

FIG. 7 is an exemplary database containing alarm templates, each comprising contextual information for an event for which an alarm can be set on an electronic device in accordance with embodiments of the present invention.

In accordance with the present invention, a user can customize existing alarm templates, or create new templates. These operations can be performed in a database such as database 700, for example. A database can be a structured set of data objects (e.g., the rows of a table), each having data corresponding to a common set of data fields (e.g., the columns of a table). Database 700, for example, can include template label field 702, template keywords field 708, and contextual information fields in the form of template graphics field 704 and template audio field 706. As discussed hereinabove, template label field 702 can be a field for template labels. Similarly, template graphics field 704 can be a field for template graphics, and template audio field 706 can be a field for template audio. Template keywords field 708 can be a field for template keywords, which can be used in step 616 of process 600 in some embodiments of the present invention to associate a parsed alarm(s) with an alarm template.

Database 700 comprises exemplary alarm template 712. Alarm template 712 can contain data corresponding to each data field, including label data 714, graphics data 716, audio data 718, and keyword data 720, each of which can be customized by a user. The data within alarm template 712 can comprise pointers to files stored outside of database 700.

In some embodiments, database 700 can be created on a transmitting electronic device, and transferred to a receiving electronic device. Doing so can be desirable because, for example, the transmitting electronic device may have a complex input device, such as a keyboard, that can facilitate creating alarm templates. If a pointer is used in alarm template 712 to refer to a file stored outside of database 700, then it can be necessary to transfer the file, in addition to database 700, to the receiving electronic device.

In some embodiments, the pointers within alarm template 712 can cause the files to which the pointers refer to become linked or attached to database 700. Because of this linkage, if database 700 is transferred to the receiving electronic device from a transmitting electronic device, the linked files can be automatically transferred to the receiving electronic device as well. For example, if audio data 718 includes a pointer referring to an audio file, then the audio file can be automatically transferred to the receiving electronic device substantially at the same time the alarm templates are transferred from the transmitting electronic device to the receiving electronic device.

In some embodiments, for a given alarm template there can be multiple data entries, corresponding to contextual information entries, for a data field (e.g., multiple text messages associated with alarm template 712). These can be selected or deselected in a sub-menu, as described hereinabove, which can be presented after the user selects the alarm template. For example, alarm template 712 can comprise a birthday alarm template. Label data 714 could contain the label "birthday," and graphics data 716 can include a first message "It is an important person's birthday today," and a second message "It is mom's birthday today." When creating an alarm, the user can select which message to include in the output contextual information after selecting the birthday alarm template.

A user can create a new alarm template that can be transferred to a receiving electronic device. An example of how this can be done is discussed below with respect to FIG. 8. As noted above for alarm template 712, alarm templates prepopulated onto a computer, such as the birthday template described above, or an electronic device can also be customized by a user.

Figure 8:
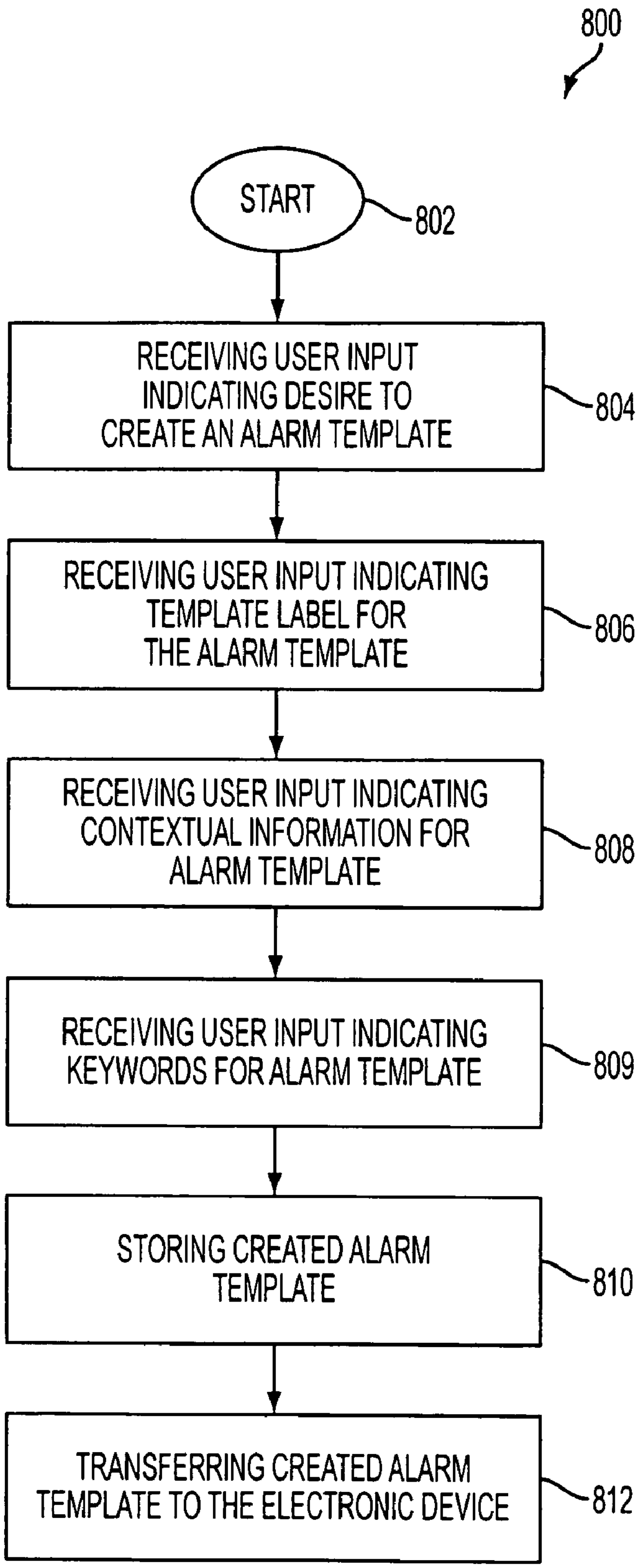
FIG. 8 is a flow chart illustrating an exemplary process for creating alarm templates in accordance with an embodiment of the present invention.

FIG. 8 is a flow chart illustrating exemplary process 800 for creating alarm templates in accordance with an embodiment of the present invention. Process 800 can be performed on an electronic device, or on a computer to create an alarm template.

At step 802, process 800 can be initialized, and at step 804, user input indicating a desire to create an alarm template can be received. The user input can include, for example, selecting an option from a menu, clicking on an icon, or a text command entered into a command line.

At step 806, user input indicating a template label corresponding to the alarm template being created can be received.

At step 808, user input indicating contextual information for the user-created alarm template can be received. As stated hereinabove, the contextual information can be displayed when the user-created alarm template is displayed to the user. The contextual information can comprise template graphics and/or template audio, either alone or in any combination. The user input can comprise inputting a pointer or any other reference to a stored file into a database such as database 700. The user input can also comprise directly entering data into the database (e.g., text messages).

At step 809, user input indicating keywords for the user-created alarm template can be received. As stated hereinabove, the keywords can relate to an event type associated with the user-created alarm template. The keywords can be used in step 616 of process 600 in some embodiments of the present invention to associate a parsed alarm(s) with an alarm template.

After the user has indicated contextual information for the alarm template, the created alarm template can be stored at step 810. In embodiments where the alarm template is created on the electronic device in which the alarm template will be associated with alarms, process 800 can end at step 810. In some embodiments, where the user-created alarm template is created external to the electronic device, such as on a computer, step 812 can be executed. At step 812, the created alarm template can be transferred and stored on the electronic device. If the content for the user-created alarm template input at step 808 comprises pointers to stored files, then the stored files can be transferred and stored on the electronic device at step 812 as well.

After the user-created alarm template is stored on the electronic device, the user-created template can be used in either process 400 and/or process 600, in the same manner generally as the alarm templates described herein. For example, the user-created alarm template can be selected at step 408 in process 400 for association with a created alarm. Also, for example, the user-created alarm template can be automatically associated with a transferred alarm at step 616 of process 600 (e.g., by matching user-indicated keywords with parsed alarms).

Process 800 can be advantageous for the reasons described hereinabove. Process 800 can further enhance the user experience because user-created contextual information can be provided. User-created contextual information can better describe the event for which an alarm is created, as compared to information provided by a pre-populated alarm template.

While preferred illustrative embodiments of the invention are described above, it will be apparent to one skilled in the art that various changes and modifications can be made therein without departing from the invention. Some of the steps of a process can be performed out of order or in parallel. Furthermore, steps can be optional and/or removed from a process. The appended claims are intended to cover all such changes and modifications that fall within the true spirit and scope of the invention.

An electronic device of the present invention may be any electronic device operative to output contextual information about an event when an alarm programmed into the electronic device goes off. The term "electronic device" can include, but is not limited to, music players, video players, still image players, game players, other media players, music recorders, video recorders, cameras, other media recorders, radios, medical equipment, calculators, cellular telephones, other wireless communication devices, personal digital assistants, programmable remote controls, pagers, computers, printers, or combinations thereof. In some cases, the electronic devices may perform a single function and, in other cases, the electronic devices may perform multiple functions (e.g., a device that plays music, displays video, stores pictures, and receives and transmits telephone calls, such as an iPhone™ marketed by Apple Inc., of Cupertino, Calif.).

Electronic devices of the present invention can be, for example, any portable, mobile, hand-held, or miniature electronic device. Miniature electronic devices may have a form factor that is smaller than that of hand-held electronic devices. Illustrative miniature electronic devices can be integrated into various objects that include, but are not limited to, watches, rings, necklaces, belts, accessories for belts, headsets, accessories for shoes, virtual reality devices, other wearable electronics, accessories for sporting equipment, accessories for fitness equipment, key chains, or combinations thereof. Alternatively, electronic devices that incorporate an input component of the invention may not be portable at all.

What is claimed is:

1. A method for outputting contextual information when an alarm stored within an electronic device goes off, wherein the contextual information is associated with an alarm template, comprising:

transferring at least one alarm template to the electronic device;

receiving user input indicating a desire to create an alarm;

receiving user input indicating an alarm date and an alarm time;

receiving user input selecting an alarm template from the at least one alarm template to associate with the alarm;

storing the created alarm; and displaying the contextual information on the electronic device from the alarm template associated with the alarm at the alarm date and alarm time.

2. The method of claim 1, further comprising receiving user input selecting a subset of the contextual information to be output at the alarm date and the alarm time.

3. The method of claim 1, wherein the outputting the contextual information from the alarm template associated with the alarm comprises displaying an image associated with the alarm template.

4. The method of claim 1, wherein the outputting the contextual information from the alarm template associated with the alarm comprises displaying an animation associated with the alarm template.

5. The method of claim 1, wherein an alarm template label is associated with the alarm template, and wherein the receiving user input selecting the alarm template to associate with the alarm comprises receiving user input selecting the alarm template label from a list.

6. The method of claim 1, wherein the receiving user input indicating the alarm date and the alarm time comprises receiving user input selecting the alarm date and the alarm time from at least one of a calendar and a menu.

7. The method of claim 1, wherein the alarm template is a data structure comprising the contextual information and a template label.

8. The method of claim 1, further comprising, before the outputting, receiving user input selecting a particular portion of the contextual information from the alarm template for output, wherein the outputting comprises outputting the particular portion of the contextual information from the alarm template associated with the alarm at the alarm date and alarm time.

9. The method of claim 1, wherein the alarm template is pre-populated with the contextual information associated with the alarm template prior to the method, and wherein the contextual information is appropriate for any date.

10. The method of claim 1, wherein the alarm template is a data structure comprising the contextual information and at least one template keyword, and wherein the at least one template keyword is related to an event type associated with the alarm template.

11. A method for providing user-created alarm templates for providing a user with contextual information when an alarm stored into an electronic device goes off, comprising:

receiving user input indicating a desire to create an alarm template;

receiving user input indicating a template label for the alarm template;

receiving user input indicating contextual information for the alarm template;

storing the created alarm template; and transferring the created alarm template to the electronic device, wherein the contextual information is displayed on the electronic device at an alarm date and an alarm time of an alarm associated with the created alarm template.

12. The method of claim 11, wherein the receiving user input indicating contextual information for the alarm template comprises receiving user input selecting a particular audio file.

13. The method of claim 11, wherein the electronic device is configured to output at least a portion of the contextual information for the alarm template at an alarm time associated with the alarm template.

14. The method of claim 11, further comprising:

receiving at the electronic device an alarm time;

associating the alarm time with the alarm template; and outputting on the electronic device at least a portion of the contextual information for the alarm template at the alarm time.

15. An electronic device comprising:

a memory configured to store a plurality of alarm templates, wherein each alarm template comprises a template label and contextual information;

user input circuitry;

a display; and control circuitry configured to:

receive a transfer of at least one alarm template;

receive a first user input from the user input circuitry that indicates an alarm time for a new alarm;

provide on the display a list of at least two template labels of at least two alarm templates from the plurality of alarm templates;

receive a second user input from the user input circuitry that selects a particular template label of a particular alarm template from the list for the new alarm; and provide on the display at least a first portion of the contextual information of the particular alarm template at the alarm time for the new alarm.

16. The device of claim 15, wherein the particular template label comprises at least one of a word and an image that summarizes the contextual information of the particular alarm template.

17. The device of claim 15, wherein the control circuitry is further configured to receive a third user input from the user input circuitry that selects the at least a first portion of the contextual information of the particular alarm template before the alarm time for the new alarm.

18. The device of claim 15, wherein the contextual information of each alarm template is independent of any particular time.

19. The device of claim 15, wherein the at least a first portion of the contextual information of the particular alarm template comprises at least one of text, a still image, and an animation.

20. The electronic device of claim 15, wherein the control circuitry is further configured to store in the memory an association between the particular alarm template for the new alarm and the alarm time for the new alarm.

* * * * *